United States Patent [19]

Lirov

[11] Patent Number: 5,289,370
[45] Date of Patent: Feb. 22, 1994

[54] AUTOMATED RESOURCE ALLOCATION METHOD EMPLOYING A LEARNING ARRANGEMENT

[75] Inventor: Yuval V. Lirov, Aberdeen, N.J.
[73] Assignee: AT&T Bell Laboratories, Murray Hill, N.J.
[21] Appl. No.: 708,582
[22] Filed: May 31, 1991
[51] Int. Cl.$^5$ .......................... G06F 15/21
[52] U.S. Cl. .................. 364/401; 364/402; 364/468
[58] Field of Search .......... 395/904, 919, 921; 364/401, 402, 468, 469, 420, 471, 474.09, 474.13, 474.15

[56] References Cited

U.S. PATENT DOCUMENTS

| | | | |
|---|---|---|---|
| 4,163,321 | 8/1979 | Cunningham | 364/474.13 |
| 4,885,686 | 12/1989 | Vanderbei | 364/402 |
| 4,947,322 | 8/1990 | Tenma et al. | 364/401 |
| 5,077,661 | 12/1991 | Jain et al. | 364/474.15 |
| 5,128,860 | 7/1992 | Chapman | 364/401 |

OTHER PUBLICATIONS

N. Metropolis et al, "The Monte Carlo Method, Journal of the American Statistical Assn", vol. 44, No. 247, Sep. 1949, pp. 335–341.
R. W. Haessler, "Selection and Design of Heuristic Procedures For Solving Roll Trim Problems", Journal of Institute of Management Sciences, vol. 34, No. 12, Dec. 1988, pp. 1460–1471.

Primary Examiner—Robert A. Weinhardt
Attorney, Agent, or Firm—Frederick B. Luludis

[57] ABSTRACT

A facility is provided for allocating a constrained common resource among a plurality of demands, in which a recommended solution to such an allocation is achieved by employing partial solutions priorly generated and stored in a database as a result of allocating the common resource among a plurality of prior, and possibly different, demands for the common resource.

4 Claims, 3 Drawing Sheets

*FIG. 3*

$\overline{W}=91$

| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 10 | 10 |
| 30 | 20 | 20 | 20 | |
| 30 | 20 | 20 | 20 | |
| 30 | 30 | 20 | 10 | |

8 {rows 1–8}, 2 {rows 9–10}, 1 {row 11}

1 = WASTE

AUTOMATED RESOURCE ALLOCATION METHOD EMPLOYING A LEARNING ARRANGEMENT

TECHNICAL FIELD

This invention relates to a method of allocating a constrained common resource among a plurality of demands for the resource.

BACKGROUND OF THE INVENTION

The term "resource allocation" problem applies to those problems, which have as a common characteristic, a need to allocate a constrained common resource among a plurality of demands for the resource. One prior arrangement generates a recommended solution to an allocation problem in accord with an algorithm comprising the steps of (a) generating a set of patterns as candidates for a recommended solution; (b) setting goals for a pattern to meet before the pattern becomes a candidate for the recommended solution; (c) searching the set of patterns and identifying those patterns that meet the goals; and (d) appending those patterns that meet the goals to the recommended solution. It can be appreciated from the foregoing that an appreciable amount of processing time may be expended to generate a recommended solution—a problem that is generally applicable to most resource allocation arrangements.

Moreover, such prior arrangements typically treat each resource allocation problem as though it were unique and, therefore, follow each step of their respective algorithms, in generating a recommended solution, even though the allocation problem may be similar to, or possibly the same as, an allocation problem that has been solved in the past.

SUMMARY OF THE INVENTION

This and other problems associated with prior arrangements adapted to solve the demand for resource allocation are dealt with by providing, in accord with the principles of the invention, a knowledge based system arranged to track recommended solutions to prior resource allocation problems and identify those prior solutions which may be used to solve a current resource allocation problem, thereby greatly enhancing the speed and delivery of a recommended solution.

BRIEF DESCRIPTION OF THE DRAWINGS

In the drawing:

FIG. 3 illustrates a recommended solution for allocating a constrained common resource among a plurality of demands where the solution is a result that is obtained by applying the principles of our invention to the numerical example illustrated in FIG. 2.

DETAILED DESCRIPTION

Figure 1:
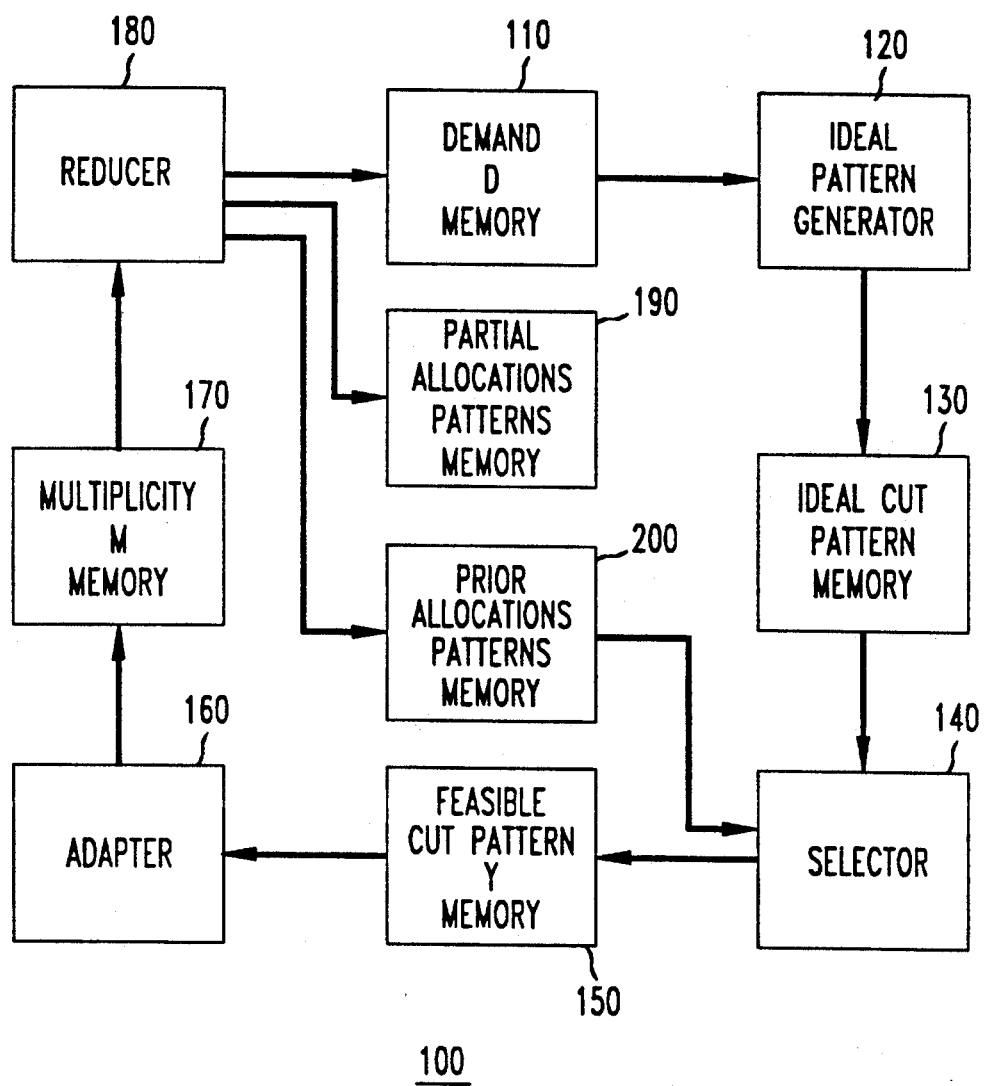
FIG. 1 is a block diagram illustrating a controller process for practicing the present invention and FIG. 2 illustrates a methodology according to the principles of our invention through the use of a numerical example, which is helpful in understanding those principles.

To aid in understanding our invention, the following description is discussed, by way of example and not by way of limitation, in terms of a paper mill production process, in which the common resource is a large roll of paper having a width W and in which the length of the paper is assumed to be significantly long relative to the width $\overline{W}$. It may be noted that the large roll is commonly referred to as a log-roll. While not limiting the principles of our invention, the large length-to-width assumption allows us to describe an illustrative embodiment of the principles of our invention without infecting the description with unnecessary dialogue about the length of the log-roll.

Specifically, consider that a log-roll is to be cut into a plurality of smaller width rolls, each smaller roll having its own width $W_i$ where i equals 1 through I, in order to meet the plurality of demands $D_i$ that are placed on the common resource, i.e. on the log-roll. For any specific width $W_i$, it may be desired that there be one or more rolls of that width $W_i$. The symbol $D_i$ identifies the total number of smaller rolls of width $W_i$ required to meet the demand of the customer while the symbol I identifies the total number of different widths $W_i$ such that each width $W_i$ is different than another width $W_j$ if i and j are different. Clearly the demand of one or more customers can be viewed as a demand vector D with I demand elements $D_i$ where each demand element $D_i$ could be the sum of the demands of several customers, while the smaller widths can be viewed as a width vector W with I smaller width elements $W_i$. Hence, the total demand TD of one or more customers may be said to be equal to a vector product $D \times W$, or:

$$D \times W = TD, \text{ or}$$

$$D_1 \times W_1 + D_2 \times W_2 + \ldots + D_I \times W_I = TD \tag{1}$$

Further, and as mentioned earlier, we do not need to worry about the length of either the large roll or any of the smaller rolls. That worry can go away by considering the length of each cut to be normalized and, in that manner, we can remove the length variable as a factor that needs further elaboration in a description of an illustrative embodiment of the principles of our invention. However, as an aside, it is worth noting that the minimum number of normalized lengths of the log-roll is equal to the quotient of the total demand TD divided by the width of the log-roll $\overline{W}$.

Still further and worth emphasizing, any cut of the log-roll can include one or more cuts of any specific width $W_i$, e.g., a single cut of the log-roll could include a plurality of cuts of the same width $W_i$. Indeed, a single cut of the log-roll could include up to $D_i$ cuts of the same width $W_i$.

The term "cut pattern", may be defined as a pattern that identifies a specific setting of the knives so as to cut a specific pattern of smaller rolls from the log-roll. As an aside, it is assumed that the length of the cut pattern will be some normalized length. It is also assumed that there will likely be a plurality of cut patterns, each of the normalized length. Only when the plurality of cut patterns is actually cut from the log-roll can the customer's demand be met. Continuing, a cut pattern may be expressed as a cut pattern vector Y of integer numbers where the cut pattern vector Y is also of dimension I and where each respective element $Y_i$ of cut pattern vector Y identifies the number of smaller rolls of width $W_i$ which are to be cut from the log-roll of width $\overline{W}$ during one roll trimming operation, i.e., during one cut of one normalized length of the log-roll.

The term "feasible cut pattern" may be defined as a specific kind of cut pattern, i.e., a feasible cut pattern is a cut pattern that satisfies certain constraints, which constraints are one form of goal to be satisfied. One constraint or goal that must be satisfied by a feasible cut pattern is that the vector product Y×W must not exceed the width $\overline{W}$ of the log-roll, i.e.:

$$Y \times W \leq \overline{W}, \text{ or}$$

$$Y_1 \times W_1 + Y_2 \times W_2 + \ldots + Y_I \times W_I \leq \overline{W} \quad (2)$$

Still other constraints or goals can be imposed on a cut pattern before it may be treated as a feasible cut pattern. The other constraints typically arise in response to process or technological limitations and to manufacturing and transportation costs. However, for purposes of describing an illustrative embodiment of the principles of our invention, and not by way of limitation, we choose to use the constraint of equation (2) in this description. If a cut pattern vector Y meets all of the constraints of a particular application, it becomes known as a feasible cut pattern and is also symbolized as a feasible cut pattern vector Y. Note that feasible cut patterns are a subset of cut patterns.

Note that a feasible cut pattern Y may not satisfy all of the demand D because it must also satisfy one or more constraints such as the constraint of equation (2). As a result, the feasible cut pattern Y may have one or more of its elements $Y_i$, which have a value of $Y_i$ that is less than the corresponding demand $D_i$. In such an event, it will be necessary that there be more than one occurrence of that width $W_i$, and perhaps the cut pattern, in the recommended solution for the trimming of the log-roll, i.e., that width $W_i$ will need to be repeated in the same or in a different cut pattern. If two or more cut patterns are identical, then it is said that there is a "multiplicity" of that cut pattern. In particular, if there are two occurrences of a specific cut pattern, the multiplicity value of that cut pattern is said to be of value two. If there are three occurrences of a specific cut pattern, the multiplicity value of that cut pattern is said to be of value three, etc. Extending this definition of the term "multiplicity", a unique cut pattern is then said to have a multiplicity of value one.

Based on the foregoing, the problem to be solved may be restated to be the timely generation of feasible cut patterns together with their respective multiplicities so as to satisfy the demand of one or more customers on the one hand, consistent with reducing waste on the other hand.

The proposed arrangement generates such feasible cut patterns using a database containing prior partial solutions and a recursive controller that follows four sets of rules. Such a controller may be arranged as illustrated in FIG. 1, and includes six memories, all of which may be suitably embodied in software and memory devices.

In particular, the four sets of rules are embodied respectively in ideal pattern generator 120, selector 140, adapter 160 and reducer 180, while the six memories are embodied in first demand memory 110, ideal cut pattern memory 130, third feasible cut pattern memory 150, multiplicity memory 170, partial allocations patterns memory 190 and prior allocations patterns memory 200.

The first memory 110 contains the customer demand vector D and, hence, its plurality of demand elements $D_i$ for the common resource.

The prior art, for example, copending U.S. patent application of Ser. No. 07/531,174, filed on May 31, 1990, now U.S. Pat. No. 5,235,508 in behalf Y. V. Lirov et al, describes certain techniques for generating a plurality of feasible cut patterns, which are stored in third memory 150. That technique involves generating a multi-dimensional random distribution function, storing the function, and then randomly generating a plurality of feasible cut patterns, which are stored in third memory 150. However, such a technique does not provide an efficient method of retaining and retrieving feasible cut patterns generated in response to solving a particular resource allocation. Accordingly, the technique must be invoked whenever feasible cut patterns are needed.

In contrast, the present invention advantageously retains in memory 200 partial solutions, or feasible cut patterns, which have been generated over the course of solving a prior resource allocation problem and provides a simple, efficient method of identifying which of the stored feasible cut patterns may be used to solve a current resource allocation problem. Accordingly, once a sufficient number of partial solutions, or feasible cut patterns, have been stored in memory 150, then there is no longer any need to generate such patterns by first generating a random function, storing the function and then generating feasible cut patterns, as is priorly done.

Specifically, generator 120, responsive to unloading from memory 110 a demand D vector, generates an ideal pattern and stores the pattern in second memory 130. Responsive to the storage of that pattern, selector 140 searches the memory 200 database of prior cut patterns and identifies, in accord with an aspect of the invention and as will be explained below in detail, selects those cut patterns Y which represent feasible solutions to meeting the ideal cut pattern generated by generator 120. Selector 140 stores each such feasible cut pattern that it identifies in fourth memory 155.

Adapter 160, responsive to the storage of such feasible cut patterns Y and to the customer's demand D, generates a multiplicity value M for each such pattern and stores the value in fourth memory 170. Responsive to the multiplicity values M that are stored in memory 170, to the feasible cut patterns Y and to the customer's demand D, reducer 180 generated for each feasible cut pattern identified by selector 140 a so-called residual demand RD (defined below), and selects a recommended feasible cut pattern Y, its multiplicity value M and its residual demand RD, in the manner discussed below. Reducer 180 then stores such selections, except the associated residual demand, in memory 190 for later use in adjusting the knives to cut the log-roll, i.e., they become part of a recommended solution for allocating the common resource among the plurality of demands.

Reducer 180 then substitutes for the demand D stored in first memory 110 the newly generated residual demands RD. Thus, the foregoing process iterates until goal identifier 120 detects that the customer's residual demand RD is equal to or less than a design parameter, which reflects an allowable and acceptable tolerance for the waste, which in an ideal case would be zero.

More specifically, generator 120 is arranged to generate an ideal cut pattern vector Y with elements $Y_i$ for each i from 1 through I using:

$$Y_i = D_i + W_i \frac{L}{2}, \quad (3)$$

where $L = 2A - B/C$, $$B = \sum_{i=1}^{I} D_i W_i, \quad C = \sum_{i=1}^{I} W_i,$$

and where A is a constraint that is satisfied by vector Y, namely, $$\sum_{i=1}^{I} Y_i W_i < A.$$

More specifically, selector 140 may be arranged to determine the "distance" of each feasible cut pattern that is stored in memory 150 from the "ideal cut pattern" (vector Y) stored in memory 130, as will be explained below in detail. Over the course of making such a determination selector 140 selects as a best candidate the cut pattern having the shortest distance. The selected cut pattern is then analyzed to determine whether or not it satisfies the imposed constraints or goals, such as the constraint that may be imposed using equation (2) as well as any other constraints or goals (i.e., selector 140 determines whether or not the generated cut pattern is a feasible cut pattern).

Selector 140 repeats the above processes until it identifies and stored in memory 155 a predetermined number of feasible cut patterns. (It is noted that if the number of prior cut patterns stored in database memory 200 is not sufficient to identify such feasible cut patterns, then such feasible cut patterns would have to be generated using a known prior art method, such as the method disclosed in the aforementioned copending application. Such newly generated cut patterns would then be stored in memory 150 as well as memory 200. Accordingly, controller 100 implements a learning feature, whereby a database of solutions to a prior allocation problem may be established for providing feasible solutions to a subsequent allocation problem.)

More specifically, adapter 160 employing the following methodology generates for each feasible cut pattern that selector 140 identifies and stores in memory 150 the aforementioned multiplicity value M.

That is, adaptor 160 generates a so-called multiplicity ratio $X_i$ for each value of i from 1 through I for which there is a feasible cut pattern element $Y_i$ that is greater than zero according to the following relationship:

$$X_i = \frac{D_i}{Y_i} \quad (4)$$

Adapter 160 then selects the smallest multiplicity ratio $X_i$ corresponding to a feasible cut pattern Y, truncates any fractional remainder from the smallest multiplicity ratio $X_i$ from equation (3), and assigns the integer part of the smallest $X_i$ as an upper limit $\overline{M}$ of the multiplicity value M for that feasible cut pattern Y. Accordingly, the multiplicity value for a feasible cut pattern Y is symbolized as M where M can have any value between zero and the upper limit $\overline{M}$, i.e., $0 \leq M \leq \overline{M}$.

Adapter 160 repeats the above processes until a multiplicity value M is generated for each feasible cut pattern Y and stored the results in memory 170.

More specifically, reducer 180 is arranged to generate so-called residual demands RD. Such residual demands RD, as mentioned above, are used to update the customer demand D and are based on (a) the customer demand D stored in memory 110, (b) the multiplicity values M stored memory 170 and (c) the feasible cut patterns Y stored in memory 150. In addition, reducer 180 selects and stores in memory 90 one of the multiplicity values M as well as its corresponding feasible cut pattern Y as a part of the recommended solution to the allocation of the current constrained common resource among the plurality of demands for the resource.

Reducer 180 generates a residual demand vector RD for each feasible cut pattern Y by subtracting from the customer demand D the vector product of the feasible cut pattern Y and its corresponding scalar multiplicity value M from the customer demand D. This may be stated in the form of an equation as follows:

$$\text{Residual demand } (RD) = D - Y \times M \quad (5)$$

Since each residual demand vector RD includes I residual demand elements $RD_i$, reducer 180 then goes on to evaluate each of the residual demands RD that it generates by selecting the largest residual demand element in the residual demand vector, Max $RD_i$, and divides the value of the largest element Max $RD_i$ by the multiplicity value M of the feasible cut pattern Y that was used in generating the residual demand RD according to equation (5). The resultant quotient is stored in memory and is referred to herein as the evaluation ratio ER for the corresponding feasible cut pattern Y, which may be stated mathematically as follows:

$$ER = \frac{\text{Max } RD_i}{M} \quad (6)$$

It is understood of course that other forms of evaluation ratio ER are also possible. For example, almost any polynomial function of $MaxRD_i$ and M would be a satisfactory evaluation ratio, as long as it is consistent with the principles of instant invention.

Reducer 180 repeats the evaluation process for each of the residual demands RD (in which, as mentioned above, there is a residual demand vector RD for each feasible cut pattern Y and, therefore, results in a corresponding number of corresponding evaluation ratios).

Reducer 180 then stores in memory 190 as the recommended partial solution to the current allocation problem the feasible cut pattern and its multiplicity value that are associated with the evaluation ratio having the smallest value. In addition, reducer 180 substitutes the associated residual demand for the demand D stored in memory 110.

Figure 2:
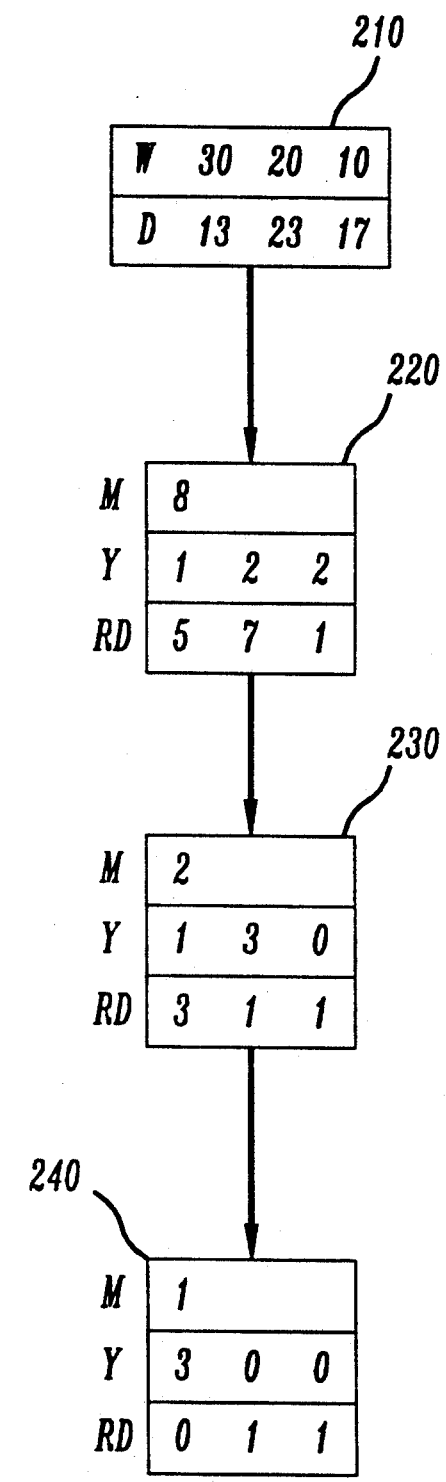

We now refer to FIG. 2 for a numerical example that illustrates the principles of the invention as articulated above. Consider a large width roll of paper, i.e., the log-roll, of width $\overline{W}$ equal to 91 units. Next, consider a requirement to cut the log-roll into ($D_1=$) 13 smaller rolls, each of width ($W_1=$) 30 units, and into ($D_2=$) 23 smaller rolls, each of width ($W_2=$) 20 units, and finally into ($D_3=$) 17 smaller rolls, each of width ($W_3=$) 10 units. Using the above symbology:

$$\overline{W} = 91 \quad (7)$$

$$W = (30, 20, 10) = (W_1, W_2, W_3) \quad (8)$$

$$D = (13, 23, 17) = (D_1, D_2, D_3) \quad (9)$$

Note the symbology of equations (7), (8) and (9) has been transferred to, and is shown in, item 210 of FIG. 2 for use in this numerical example.

Assume also that third memory 200 contains priorly generated cut patterns $Y^1=(1,3,0)$, $Y^2=(2,1,1)$, $Y^3=(1,2,2)$, $Y^4=(2,0,3)$, and $Y^5=(3,0,0)$. Now goal generator 120 generates a "goal cut pattern vector" according to equation (3) to be $$Y_1 = 13 + \frac{30}{2} \cdot \frac{2.91 - (13.30 + 23.20 + 17.10)}{30^2 + 20^2 + 10^2} =$$

$$13 + 15(-0.598) = 13 - 8.97 = 4.03,$$

$$Y_2 = 23 + \frac{20}{2}(-0.598) = 17.02,$$

$$Y_3 = 17 + \frac{10}{2}(-0.59) = 14.05.$$

Next, selector 140 generates the squares of distances of the available vectors in memory 150 from the new vector $Y = (4.03, 17.02, 14.05)$ as follows:

$$d(Y, Y^1) = (4.03-1)^2 + (17.02-3)^2 + (14.05-0)^2 = 403.18$$

$$d(Y, Y^2) = (4.03-2)^2 + (17.02-1)^2 + (14.05-1)^2 = 431.02$$

$$d(Y, Y^3) = (4.03-1)^2 + (17.02-2)^2 + (14.05-2)^2 = 379.28$$

$$d(Y, Y^4) = (4.03-2)^2 + (17.02-0)^2 + (14.05-3)^2 = 415.90$$

$$d(Y, Y^5) = (4.03-3)^2 + (17.02-0)^2 + (14.05-0)^2 = 488.14$$

In the manner discussed above, selector 140 selects vector $Y^3$ since its distance to the "goal cut pattern" is the smallest. Selector 140 then analyzes the selected cut pattern to determine whether or not the pattern $Y^3$ satisfies certain constraints or goals, e.g., the constraint represented by equation (2). In this case, note from the W vector in item 210 and from the Y vector in item 220 that:

$$Y_1 \times W_1 + Y_2 \times W_2 + Y_3 \times W_3 \leq \overline{W}, \text{ or}$$

$$1 \times 30 + 2 \times 20 + 2 \times 10 = 90 \leq 91 \quad (10)$$

Hence, the cut pattern Y in item 220 is a feasible cut pattern.

Accordingly, adapter 160 generates multiplicity value M for each feasible cut pattern Y. Note that, by use of the multiplicity ratios $X_i$ from equation (4), eight repetitions of the feasible cut pattern in item 220 is the maximum possible number of cuts that may be obtained using that feasible cut pattern without exceeding the customer's demand D. Note that, if there were nine repetitions of the feasible cut pattern in item 220, then there would be 18 small rolls of width ($W_3=$) 10 whereas the demand $D_3$ for that width ($W_3=$) 10 was only 17. Therefore, the upper limit $\overline{M}$ of multiplicity value M of the feasible cut pattern Y in item 220 has a value of eight, i.e. $\overline{M}=8$. In present illustrative example, it is assumed that $M=\overline{M}$.

Reducer 180 using the initial customer demand vector D from first memory 110, the plurality of multiplicity values M from fourth memory 170 and the plurality of feasible cut patterns Y from third memory 150 generates residual demand vector RD to update the initial demand D, as discussed above. Reducer 180, in the manner discussed above, then selects one of the multiplicity values M as well as its corresponding feasible cut pattern Y for storage in database memory 200 and for storage in memory 190 as a part of the recommended solution.

In the present illustrative example, reducer 180 generates the residual demand vectors RD illustrated in item 220 by determining the difference between the demand D in item 210 and the amount that demand D that is satisfied by the multiplicity value M associated with the recommended feasible cut pattern Y. For item 220, the residual demand RD that remains to be satisfied after eight, i.e. $M=8$, cuts in accord with the recommended feasible cut pattern $Y=(1,2,2)$ would be a residual demand vector RD of $((RD_1,RD_2,RD_3)=)$ (5,7,1).

In accord with the principles of the present invention, the foregoing process then identifies item 220 as being a part of the recommended solution. The foregoing process is then repeated to identify the next recommended feasible cut pattern, as represented by item, or block 230, and then goes to repeat the process once more, as represented by item, or block 240.

As earlier mentioned, the inventive arrangement repeats the methodology until generator 120 is satisfied that some predetermined level of tolerance has been met. In the present illustrative example, it is assumed that an acceptable level tolerance may be set such that no residual demand element exceeds a value of one. What that means is that an item, for example, item 240, may be added to the recommended solution as long as it includes a feasible cut pattern and no element in its residual demand exceeds a value of one.

Turning now to FIG. 3, there is shown a summary of the results of the illustrative example of FIG. 2. That is, FIG. 3 illustrates the manner in which the iterative methodology combines the results illustrated in blocks 220, 250 and 270 of FIG. 2 to obtain a recommended solution to the custore.

First, item 220 of FiG. 2 recommends eight multiplicities, i.e., $M=8$, of feasible cut pattern $Y=(1,2,2)$ be cut from the log-roll in smaller widths $W=(30,20,10)$. Translating FIG. 2 into FIG. 3, note that the recommended solution includes the knives being set to cut the log-roll for one width of 30 units, two widths of 20 units, and two widths of 10 units. That cut is repeated eight times, each cut being of the aforesaid normalized length.

Second, item 230 of FIG. 2 recommends two multiplicities, i.e., $M=2$, of feasible cut pattern $Y=(1,3,0)$ be cut from the log-roll in smaller width $W=(30,20,10)$. Translated into FIG. 3, note that the recommended solution includes the knives being set to cut the log-roll for one width of 30 units, three widths of 20 units, and zero widths of 10 units. That cut is repeated two times, each cut being of the aforesaid normalized length.

Third, item 240 of FIG. 2 recommends one multiplicity, i.e., $M=1$, of feasible cut pattern $Y=(2,1,1)$ be cut from the log-roll in smaller width $W=(30,20,10)$. Translated into FIG. 3, note that the recommended solution includes the knives being set to cut the log-roll for two widths of 30 units, one width of 20 units, and one width of 10 units. That cut is performed one time and the one cut is of the aforesaid normalized length.

Note that the waste using the recommended solution obtained in accord with the present illustrative example is only one unit for each of the eleven cuts of the log-roll.

Although the invention has been described and illustrated in detail using a log-roll trimming example, it is to be understood that the same is not by way of limitation. Hence, the spirit and scope of our invention is limited only by the terms of the appended claims. For example, it can be appreciated that the claimed invention has application in other technologies requiring a solution to allocating a common resource, for example, the bandwidth of a data channel, among a plurality of demands for the common resource, for example, data modules.

I claim:

1. A method for allocating a constrained common resource among a current plurality of demands for the resource comprising the steps of
   (a) searching a database having stored therein a plurality of prior partial solutions generated as a result of allocating said common resource among respective ones of a plurality of prior demands and selecting from said database those of said prior partial solutions that may be used to form a recommended solution of allocating said resource among said current plurality of demands,
   (b) generating a multiplicity ratio for each of said selected partial solutions,
   (c) responsive to each said multiplicity ratio and its corresponding one of said selected partial solutions, reducing said selected partial solutions to a single partial solution, which can be included in said recommended solution,
   (d) repeating steps (a), (b), and (c) until a predetermined level of tolerance is met,
   (e) providing each said single partial solution and its corresponding multiplicity ratio as the recommended solution, and
   (e) allocating the common resource among the current plurality of demands in accordance with the recommended solution.

2. The method set forth in claim 1 wherein said step of searching and selecting includes the steps of
   (h) determining the distance between each of said partial solutions stored in said database and an ideal solution serving as a goal in determining said recommended solution, and
   (i) selecting as candidates those of said partial solutions whose associated distance is a minimum value.

3. The method set forth in claim 1 wherein said step of generating said multiplicity ratio includes the steps of
   (h) responsive to a first one of said selected partial solutions, generating a plurality of multiplicity ratios,
   (i) selecting as the multiplicity ratio for said first partial solution the integer portion of that one of said multiplicity ratios having the smallest value, and
   (j) repeating steps (h) and (i) for the remaining ones of said selected partial solutions.

4. The method set forth in claim 1 wherein said step of reducing said selected partial solutions to a single partial solution includes the steps of
   (h) generating a residual demand for each of said selected partial solutions,
   (i) generating an evaluation ratio for each said demand,
   (j) comparing the evaluation ratio for each of said selected partial solutions, and
   (k) responsive to the evaluation ratio having the smallest value, appending to the recommended solution the corresponding selected partial solution, residual demand and multiplicity value.

* * * * *